(12) United States Patent
Anderson et al.

(10) Patent No.: US 6,208,318 B1
(45) Date of Patent: *Mar. 27, 2001

(54) SYSTEM AND METHOD FOR HIGH RESOLUTION VOLUME DISPLAY USING A PLANAR ARRAY

(75) Inventors: Douglas W. Anderson, Richardson; Thomas Drew Fisher, Dallas; Gregory A. Hatch, Plano; Tommy Dean Wright, Irving; Christine R. Spiegl, Plano, all of TX (US)

(73) Assignee: Raytheon Company, Lexington, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/371,684

(22) Filed: Jan. 12, 1995

Related U.S. Application Data

(63) Continuation of application No. 08/082,312, filed on Jun. 24, 1993, now abandoned.

(51) Int. Cl.[7] ..................................................... G09G 5/00
(52) U.S. Cl. ................................................. 345/1; 348/52
(58) Field of Search .................................... 359/224, 236, 359/462; 348/42, 51, 60, 52; 345/6, 139, 1, 2, 419

(56) References Cited

U.S. PATENT DOCUMENTS

| 2,967,905 | * | 1/1961 | Hirsch ..................................... 348/51 |
| 2,979,561 | * | 4/1961 | Hirsch ..................................... 348/51 |
| 3,077,816 | * | 2/1963 | Hirsch ................................. 348/51 X |
| 4,006,968 | * | 2/1977 | Ernstoff et al. . |
| 4,290,083 | * | 9/1981 | Collender ........................... 348/42 X |
| 4,692,878 | * | 9/1987 | Ciongoli .............................. 345/6 X |
| 4,871,231 | * | 10/1989 | Garcia ................................ 348/51 X |
| 4,884,068 | * | 11/1989 | Matheny et al. ........................ 345/1 |
| 5,061,049 | * | 10/1991 | Hornbeck .............................. 359/224 |
| 5,146,404 | * | 9/1992 | Calloway et al. ........................ 705/1 |
| 5,184,956 | * | 2/1993 | Langlais et al. .......................... 345/1 |

* cited by examiner

*Primary Examiner*—Kent Chang
(74) *Attorney, Agent, or Firm*—Baker Botts L.L.P.

(57) ABSTRACT

An image display apparatus comprises a main display and an auxiliary display. The main display is used to produce a volumetric image such as graphical image, and the auxiliary display is used to generate two dimensional image such as text image. The auxiliary display is located adjacent the the main display and being able to move relative to the main display along a path extending in a direction substantially circumferential to the main display.

10 Claims, 13 Drawing Sheets

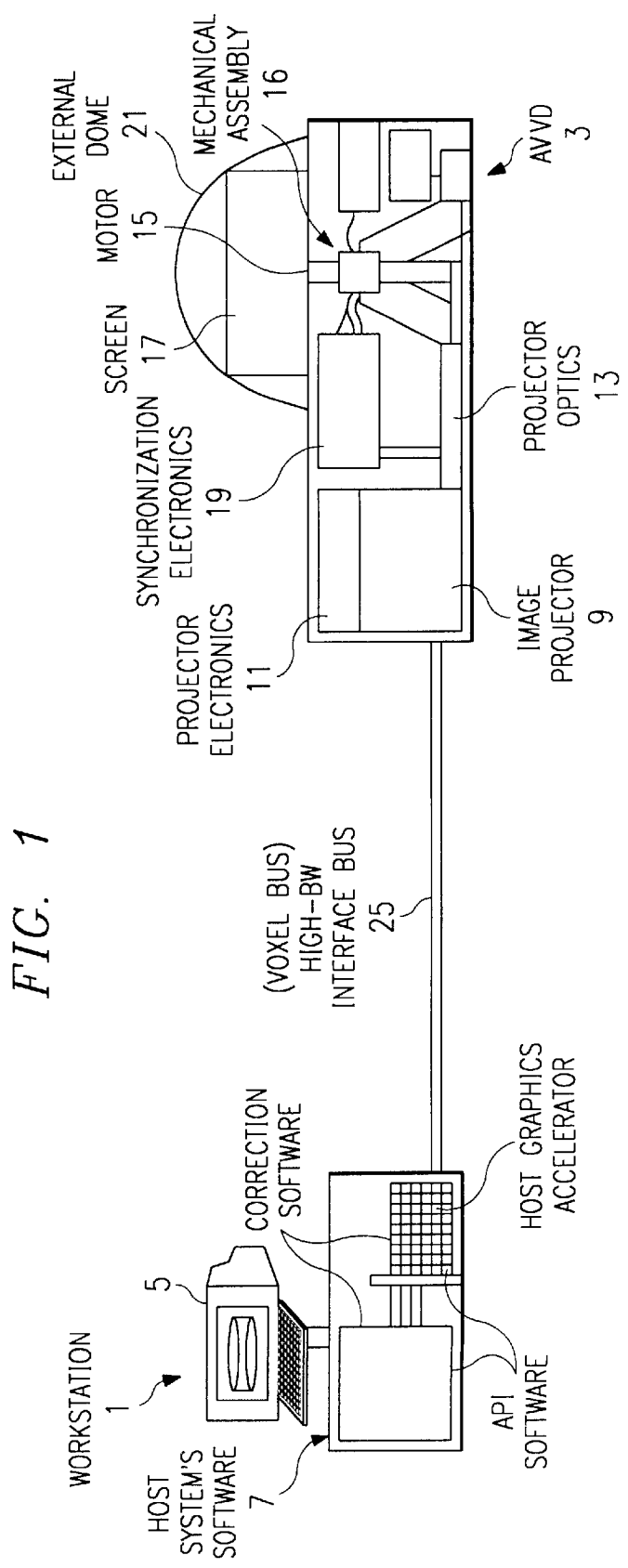

HEAD-UP DISPLAY ON TRACK FOR AUXILIARY TEXT, SYMBOLOGY OR ICONS

HEAD-UP DISPLAY (MOVEABLE) W/ PROJECTION SYSTEM

CONTAINMENT DOME

TRACK FOR HEAD-UP DISPLAY

DISPLAY SCREEN

SYSTEM AND METHOD FOR HIGH RESOLUTION VOLUME DISPLAY USING A PLANAR ARRAY

This application is a continuation of application Ser. No. 08/082,312 filed Jun. 24, 1993, now abandoned.

BACKGROUND OF THE INVENTION

1. Field of the Invention

This invention relates to a system and method for a high resolution, fully addressable volumetric display using a planar array.

2. Brief Description of the Prior Act

It has been known in the prior art to modulate or scan a beam, such as a laser beam, and then to project the scanned beam onto a screen. Examples of such systems are set forth in the Brief Description of the Prior Art in Garcia, Jr. et al. U.S. Pat. No. 5,042,909 and as well as in that patent. The prior art listed hereinbelow is incorporated herein by reference.

Such autostereoscopic volumetric display systems and methods have been described in the prior art and include a vertical planar screen rotated about a vertical axis, a first mirror located away from the vertical axis facing and below the screen which is also rotated with the screen about the same vertical axis and a second mirror located on the same rotational vertical axis, rotated with the screen and the first mirror and tilted so that an image projected parallel to the vertical axis is reflected from the second mirror to the first mirror and from the first mirror to the screen. The disclosures in the patents to Solomon (U.S. Pat. No. 4,983,031), Garcia (U.S. Pat. No. 5,042,909) and Botchko (U.S. Pat. No. 5,148,310) are exemplary of such prior art. Methods of generating such images using one or more scanned serial light sources are also described in the prior art as exemplified by the disclosures in the above mentioned Garcia and Botchko patents. Transformations are further described which translate a serial light beam input into flat images which are subsequently projected onto various display surfaces, this being exemplified in the disclosures of each of the above-mentioned patents.

Image sources described in the prior art comprise serial light sources where a light beam is cut into slices and projected onto the display. This limits the ability of the prior art to generate an image with resolution sufficiently high to be useful or to place a sufficient number of points of light simultaneously onto the display screen. The term "simultaneously" is defined herein as—appearing to the viewer to be simultaneous—even though the points of light are not initially generated simultaneously in time. Defects inherent in the prior art as described hereinabove include distortion, focus and image rotation errors.

The prior art also describes gas ion laser image sources which cannot generate full color images. Generating any color other than red, green or blue requires illuminating the same physical location simultaneously with more than one laser (in the case of a multicolor system including colors other than the primary colors). For example, a yellow point requires both a red and a green laser. To accomplish this, first, multiple lasers must be very precisely aligned to generate a single point. Voltage controlled oscillators or scanners suffer from both non-linearities of positioning and electrical drift. This, in essence, prevents the perfect alignment of multiple image sources which is necessary to generate nonprimary colors. Second, using two or more points of laser light to generate one viewable spot significantly reduces the number of points of light available to form an image, further reducing the resolution of the display.

One well known problem with volumetric displays is selection of the viewing perspective from which to display text and other two-dimensional symbology or icons. Although the volumetric image may be both viewable and useful from all aspect angles, it is impossible to pre-select the position of the viewer. Furthermore, doing so would obviate the usefulness of a volumetric display which can be viewed from all sides. This problem is not addressed by the prior art.

SUMMARY OF THE INVENTION

In accordance with the present invention, the aforementioned problems inherent in the prior art as well as other problems are overcome or minimized. There is provided a three-dimensional, full color, fully addressable high resolution display system. The system generates three-dimensional images by projecting light beams onto a rotating surface. The size of the spinning surface defines the projectable volume. Points are plotted in a pre-defined two-dimensional space (x-y, z-r or other coordinate system). The flat images are projected against the spinning display surface using mirrors and lenses. When the light beams strike the display surface, the surface diffuses the beam to form a point. By timing the light beams as the rotating surface sweeps through the display volume, the light patterns allow viewers to perceive a three-dimensional image.

A planar light array is controlled to place multiple beams of light simultaneously onto the display surface, enabling high resolution images to be generated. Unlike gas-ion laser systems described in the prior art, the system can generate full color images. In the preferred embodiment, three planar arrays are used, with a white illumination source and filters or dichroic beam splitters to separate the incoming light into red, green and blue components. In a second embodiment, three planar arrays are used, each with a separate illumination source. The illumination sources or lamps are red, green and blue, respectively. In a third embodiment, a tri-colored wheel (red, green, blue) is used with a white illumination source and image generation is timed to generate full color images. Because all of the elements of the array of the first and second embodiment can be used simultaneously to place light onto the display surface, generating full color displays does not reduce the points of light available for the images.

Volume display system practice is refined and extended by defining a system which corrects defects inherent in the prior art, including distortion, focus and image rotation errors by defining a modular, optical system which allows the effective interface of various image sources, including non-scanned planar arrays, to display devices of various configurations and by defining a configuration in which the first rotating mirror may be replaced by a fixed toroidal mirror, further simplifying the mechanical complexity. An auxiliary display can be provided to augment the three-dimensional images with text. This auxiliary display may be positioned anywhere around the circumference of the volumetric display.

An image is projected along an optical axis which is parallel to the rotation axis. For mechanical practicality, it is desirable to minimize the size of the first rotating mirror to reduce the moment of inertia that must rotate and to minimize the diameter of the optics below the second mirror so that a shaft may be formed which can be supported by through-mounted bearings of minimum size. In order to satisfy these constraints, a pupil must be formed by the optics at or near the second mirror. For mechanical convenience, the optics within the shaft will rotate with the mirrors and screen, but are not required to do so. Due to the configuration of the rotation axis with respect to the projected image, the image will appear to rotate about the center of the screen. A planar image source of fixed pixel arrangement will not generally be used efficiently in this case, because the array must be oversized to allow for the image rotation. In this situation, optical means for derotation of the various configurations such that they contain an odd number of reflections, is rotated about the optical axis in such a way as to counteract the image rotation induced by the rotation of the original mirrors and screen. Alternatively, image sources which do not necessarily include a fixed pixel pattern may correct for image rotation optically as above or electronically or in software.

For aesthetic reasons, the first mirror is placed below the rotating screen in order to avoid entering the line-of-sight of the viewer. As a result, the screen is effectively tilted with respect to the original axis. This results in two defects. First, the image cannot be in focus throughout the full screen area and second, a non-symmetric distortion commonly known as keystone distortion afflicts the image. For the focus error, two solutions are provided. First, the cone angle of the light converging to each image point may be reduced to minimize the effect of the defocus. This solution is limited by the optical invariant and results in reduced illumination at the screen, but is practical for scanned laser systems, at least. The second solution results from the application of the Schelmpflug effect, tilting the image source in such a way as to compensate for the apparent tilt of the screen. The second error may be solved electronically, for example, by warping the raster of a CRT used as an image source or in software, by calculating the warping of the object to compensate for the optical keystone.

The optical system is intimately associated with a particular mechanical configuration in order to satisfy the mechanical constraints described above, yet must be sufficiently flexible to allow for various potential image sources. By providing for a modular interface at the end of the rotating mechanical shaft, various optical configurations can be easily implemented. The optical system associated with the rotating display is designed to accept light of a specified nature. In general, the interface will occur in a collimated space, with a real pupil. A maximum aperture diameter and field angle are specified at the interface pupil. For a given screen format, these values then define the focal length and f/ number of the display optics. Hence, various display formats can be designed, all with the same interface parameters. Similarly, on the source side of the interface, optical systems are designed for various types of light sources, including CRT, scanned lasers, emitting arrays, such as laser diode arrays, or reflective arrays, such as digital micromirror device arrays. Each system is designed to have the same parameters at the interface and therefore can be used with any display system designed with the same parameters. Since not all sources will require correction of image rotation and/or keystone distortion and/or image plane tilt, these corrections are not provided on the display side. Such correction must be added, as necessary, on the source side of the interface.

A further refinement of the display eliminates the first rotating mirror, reducing the moment of inertia of the mechanical system. A fixed toroidal or conical mirror, symmetric about the axis of rotation, can be used to provide the same function as the rotating mirror. Because of the geometry of the toroidal mirror, severe constraints are placed on the optical system. In particular, the mirror located on the axis of rotation and the optics adjacent thereto will be much larger due to the pupil being more distant from the fixed mirror than it would have been from the rotating mirror which was replaced. Of course, this method of use of the fixed toroidal or conical mirror to replace the first rotating mirror can be designed with the modular interface as well, allowing conversion to this method when optical and mechanical tradeoffs are justified.

Other potential improvements include dual off-axis optical systems which project on both sides of the screen simultaneously, thereby effectively doubling the available scene detail. Constraining the image to either the left or right half of the screen increases resolution while still allowing the whole volume to be addressed (at the expense of more potential scheduler conflicts).

A "Head-Up Display" is placed on a track which runs around the circumference of the volumetric display. The display is movable along the track to a position convenient to the viewer, eliminating the need to predefine the position of the viewer. Two-dimensional icons and/or text are projected onto the Head-Up Display. The projection system for the Head-Up Display moves on a carriage with the Head-Up Display screen. The Head-Up Display provides transparency through which the volumetric display may be viewed if the viewer so desires. The Head Up Display further increases the resolution of the volumetric display by removing the requirement for the volumetric display to display text. All points of light on the volumetric display can thus be used for volumetric images.

BRIEF DESCRIPTION OF THE DRAWINGS

FIG. 1 is an elevational view of a three dimensional display and work station in accordance with the present invention;

FIG. 4b is a top view of the mechanical assembly as shown in FIG. 4a;

FIG. 4c is a side view of the motor housing and structure thereon of the motor assembly shown in FIG. 4a;

FIG. 6b is a schematic diagram of a mirror with sensor for use in conjunction with the circuit of FIGURE 6a;

FIG. 10b is a top view of the Head-Up Display assembly as shown in FIGURE 10a.

DESCRIPTION OF THE PREFERRED EMBODIMENT

Figure 2A:
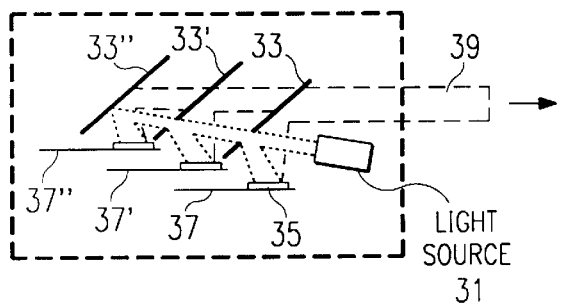
FIGS. 2a to 2e set forth several embodiments of image projectors in accordance with the present invention.

Referring first to FIG. 1, there is shown a display system in accordance with the present invention. The system comprises a work station 1 which is a standard commercial computer whereat software including image data base functions and manual data entries can be performed to control a three dimensional display system or advanced volume visual display (AVVD) 3 interconnected by a voxel bus 25. The work station 1 includes a standard keyboard and monitor 5 as well as host graphics accelerator hardware, such as, for example, an Analogic Corp. Model MSP 6C30 which performs conversions and table look-ups very rapidly necessary to generate the display list or dlist (all of the information required to recreate a three dimensional image for a complete rotation of the disk or screen), data storage and data processing equipment 7 to store application program interface (API) software, correction software, host system software and host graphics. The data processing equipment includes all of the software required to program the display and some of the software to convert the program into the electronic signals that drive the device. The three dimensional display system 3 includes an image projector 9 with projector electronics 11 for projecting a two dimensional image, the image projector being. embodied by any of the prior art two dimensional image projectors or being a matrix of digital micromirror devices (DMDs), also known as deformable mirror devices (DMDs), such as , for example, described in U.S. Pat. No. 5,061,049 of Larry J. Hornbeck, projector optics 13 for projecting and derotating the two dimensional image as will be explained hereinbelow, a motor 15 and mechanical assembly 16 for driving the screen 17, synchronization electronics 19 for synchronizing the two dimensional image projected by the image projector with the speed of the motor and a containment dome 21 within which the display is disposed. It should be understood that though specific forms of DMDs are discussed herein, types of such devices which can be operated digitally or non-digitally and which provide various gradations of reflected light in addition to only on or off can be used and are contemplated for use in conjunction with the invention. The screen 17 can be a flat vertical screen, as shown, a helix, a double helix and other surface configurations. An optional Head-Up Display 23 (not shown in FIG. 1) for auxiliary text, symbology or icons can be provided on the display system and either be stationary or translate around the circumference of the external dome 21. The interface between the work station 1 and the three dimensional display hardware 3 is the voxel bus 25.

The host system software comprises the host system operating system, networking capabilities, windowing system and tools such as libraries and compilers. The application program interface (API) software is the software that provides a programmer access to the advanced volume visualization display (AVVD) and provides an object oriented approach to programming applications. The API includes the SIGMA classes and the AVVD library which is a more traditional function oriented set of routines and support libraries. The correction software provides corrections to display lists that are the result of electrical mechanical and optical noise or nonlinearities. The work station high speed bus is one of the main buses of the host system and represents the interface between the main CPU/memory and the host graphics accelerator. Some examples are VME, S-bus, Future Bus, SCSI and M-Bus. The host graphics accelerator is the hardware that provides fast computations for scheduling and image transformations as well as a high speed image output rate to the AVVD. The scheduling and image transformations could also be performed in software and part of the main CPU, rather than with graphics accelerator hardware. The voxel bus is the link between the host computer and the AVVD. The image projector is the system that generates synchronized RGB images in two dimensions that are displayed on the rotating screen. The projector electronics receives data from the voxel bus and drives the projector's light valves and or modulators. The projector optics provides focusing and optical derotation prior to light entering the rotating mechanical system. The synchronization electronics takes information from the mechanical assembly regarding the screen position and uses it to control the rotation speed and the image update rate of the image projector. The screen is a flat surface either rectangular or semicircular supported vertically and covered with a diffusive coating. As the screen rotates, light is projected and diffused, resulting in three dimensional images. The external dome is mainly for safety reasons as well as reducing air turbulence. The motor drives the mechanical assembly and rotates the screen. The mechanical assembly is composed of the rotating screen, the motor, the vertical optics shaft (to be described hereinbelow) and positional sensing electronics to indicate the rotational position of the screen.

The image projector is an electro-optical system that combines images generated from three independent subsystems. Each of the independent subsystems (RGB) is capable of generating parallel randomly addressed points of light. This array of individually addressable light sources is updated in rapid succession to generate a sequence of frames that, when projected onto the rotating screen, produces three dimensional images. Each element of the array is also capable of modulating to produce various levels of shading.

Several embodiments of image projectors are shown in FIGS. 2a to 2e. All of these embodiments use passive subsystems which are illustrated using external light sources. Active subsystems would only have outgoing light with no external light source.

Referring first to FIG. 2a, there is shown an image projector having a light source 31, which can be either a white light source or independent red, green and blue (RGB) sources (coherent or incoherent). The light passes to a first dichroic beam splitter 33 which passes two of the three colors from the light source and reflects the third color onto a digital micromirror device (DMD) 35 which, depending upon. the voltage on the control electrode 37 thereof, controls the deflection of the DMD anywhere from zero or no deflection of the light to deflection of all of the light impinging thereon back along the light path travelled by the other two colors. This same action takes place at the second and third dichroic beam splitters 33' and 33" except that each of these beam splitters is responsive to a different one of the three colors generated by the light source 31. The result is that some combination of red, green and blue light (the amount of transmitted light of one or two of the colors can be zero) is ultimately reflected onto the output path 39 to provide the desired color programmed into the DMDs 37, 37' and 37".

Figure 2B:
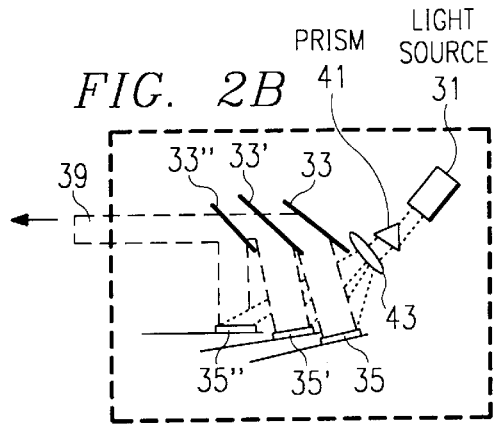

Referring to FIG. 2b, the system operates as above described except that the initial light from the light source 31 is broken into the red, green and blue light components by the prism 41 and lens 43. The light components are individually directed thereby to DMDs 35, 35' and 35" and reflected therefrom onto dichroic beam splitters 33, 33' and 33", all of which direct the individual colors along the same output light path 39 to provide the desired color.

Figure 2C:
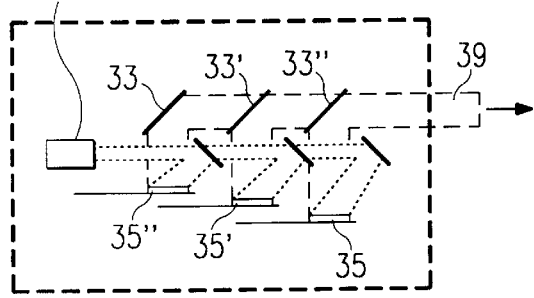

Referring now to FIG. 2c, the light source 31 directs light as in FIG. 2a except that the reflected light from each DMDs 35, 35' and 35" is reflected to dichroic beam splitters 33, 33' and 33" which reflect and pass light as shown so that the three light paths coincide and provide the output light path 39 of the desired color.

Figure 2D:
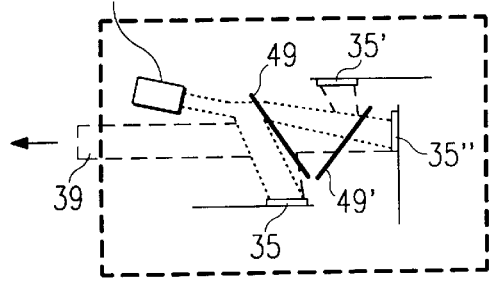

Referring now to FIG. 2d, the light source 31 directs light to dichroic beam splitters 49 and 49' which reflect one color to a first DMD 35 which can reflect some or all of such light back to dichroic beam splitter 49 and then onto output light path 39. The remainder of the light from the light source 31 travels to mirror 491, part of which is reflected to DMD 35' and then back to mirror 49' and then to light path 39 and the remainder of the light passes through mirror 49' to DMD 35", this light being reflected back through mirror 49' to the output light path 39.

Figure 2E:
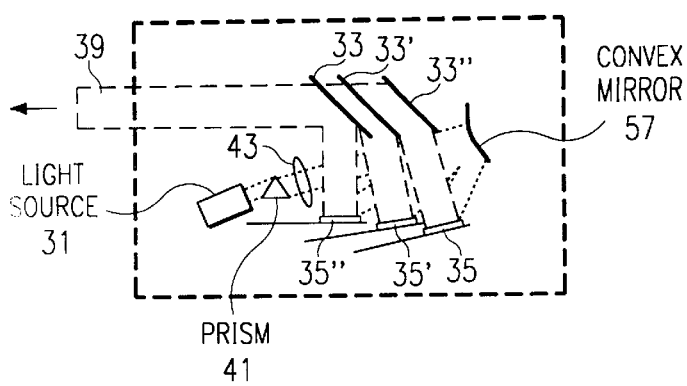

Referring now to FIG. 2e, the light source 31 provides light through a prism 41 and lens 43 as in FIG. 2b which breaks up the light into three separate paths, each path of a single one of the colors red, green and blue. The light paths strike a convex mirror 51 which reflects each light path to an individual DMD 35, 35' or 35". The light is reflected from the DMDs in accordance with the signals on the control electrodes 37, 37' or 37" thereof via dichroic beam splitters 33, 33' and 33" onto the output light path 39 to provide the desired output color.

All of the mirrors referred to above with reference to FIGS. 2a to 2e which both transmit light of predetermined frequencies therethrough and reflect light of predetermined frequencies are preferably dichroic beam splitters. The DMDs reflect back anywhere from none to substantially all of the light impinging thereon, this being dependent upon the signal of the control electrode 37, 37' or 37" thereof.

Figure 3:
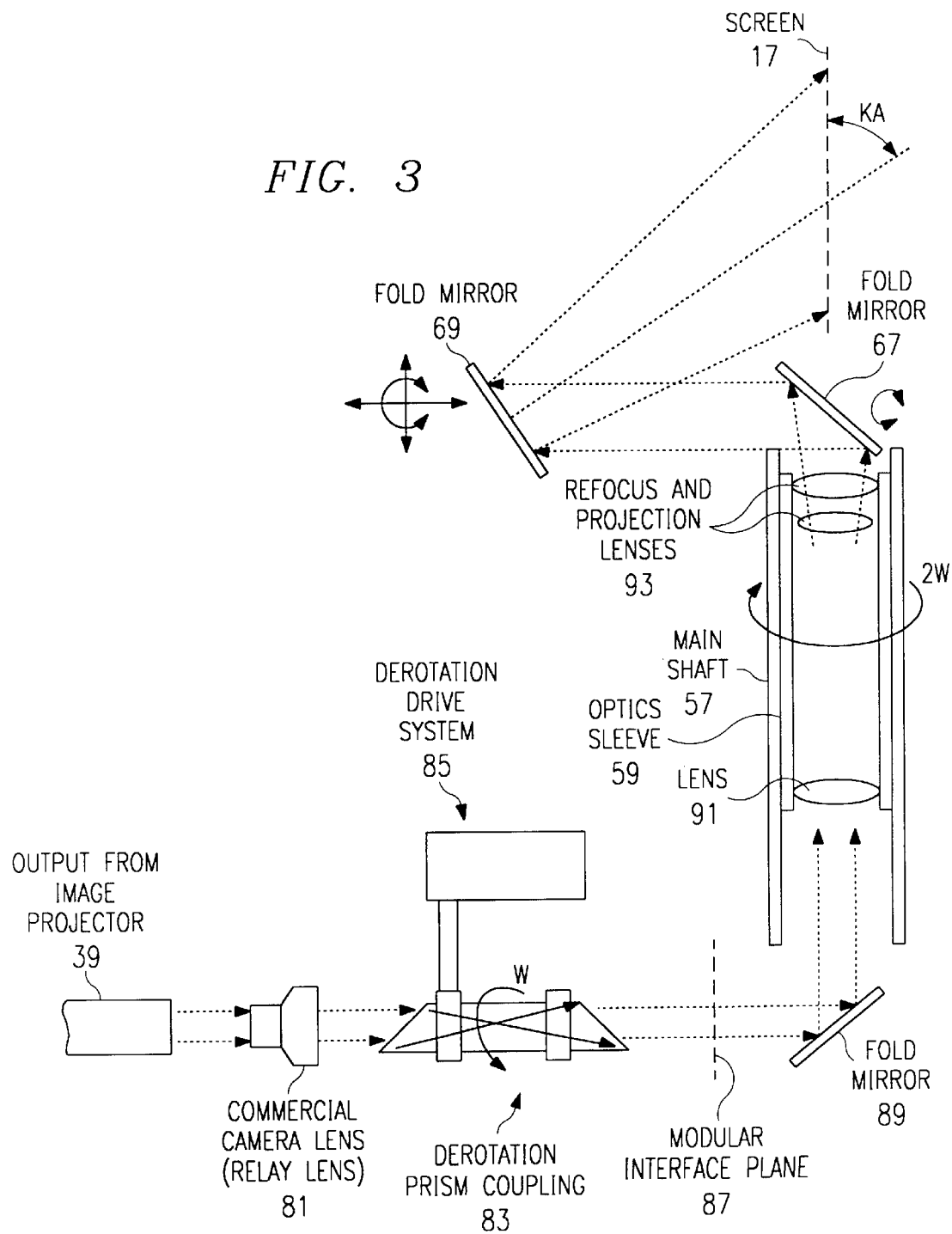
FIG. 3 is a schematic diagram of the projector optics in accordance with the present invention.

The projector optics 13, which is shown in detail in FIG. 3, provides the proper focusing and optical derotation for the images emanating from the image projector 9. The projector optics as set forth in FIG. 3 also includes the common optics disclosed in FIGS. 4a to 4d.

The projector optics includes a lens relay 81 which receives the output 39 from the image projector and matches this output to the common optics with regard to collimation, field angle and entrance pupil diameter. The matched light from the relay lens 81 is passed to a derotation prism 83 which rotates at one-half the angular velocity of the screen to compensate for the rotation of the image on the screen caused by the system design and causes the image to stand upright on the screen. The derotation prism may be one of several possible configurations, all of which share the characteristics of having an odd number of reflections, for example, Dove prism, Schmidt prism, Pechan prism, K-mirror. The prism 83 is rotated by a derotation drive system 85 which synchronizes the rotation thereof to the rotation of the screen 17 directly through, gears or by electronic synchronization in standard manner. This can also be accomplished with software. The output of the derotation prism is a two dimensional image located at the modular interface plane 87 which is, a conceptual line separating the projection optics from the common optics and which can be a scanned image as in the above described prior art or an instantaneous two dimensional image as would be provided when the image projector utilizes DMDS. The light at the modular interface plane is now operated upon by the common optics which includes a fold mirror 89. which directs the image through the lens 91 and the refocus and projection lenses 93 in the hollow main shaft 57 and optics sleeve 59 therein of the motor rotor (to be explained in detail hereinbelow) to the fold mirror 67. The image is then reflected onto a last fold mirror 69 which rotates with the screen 17 and projects the image onto the screen as will be explained in detail hereinbelow.

Figure 4A:
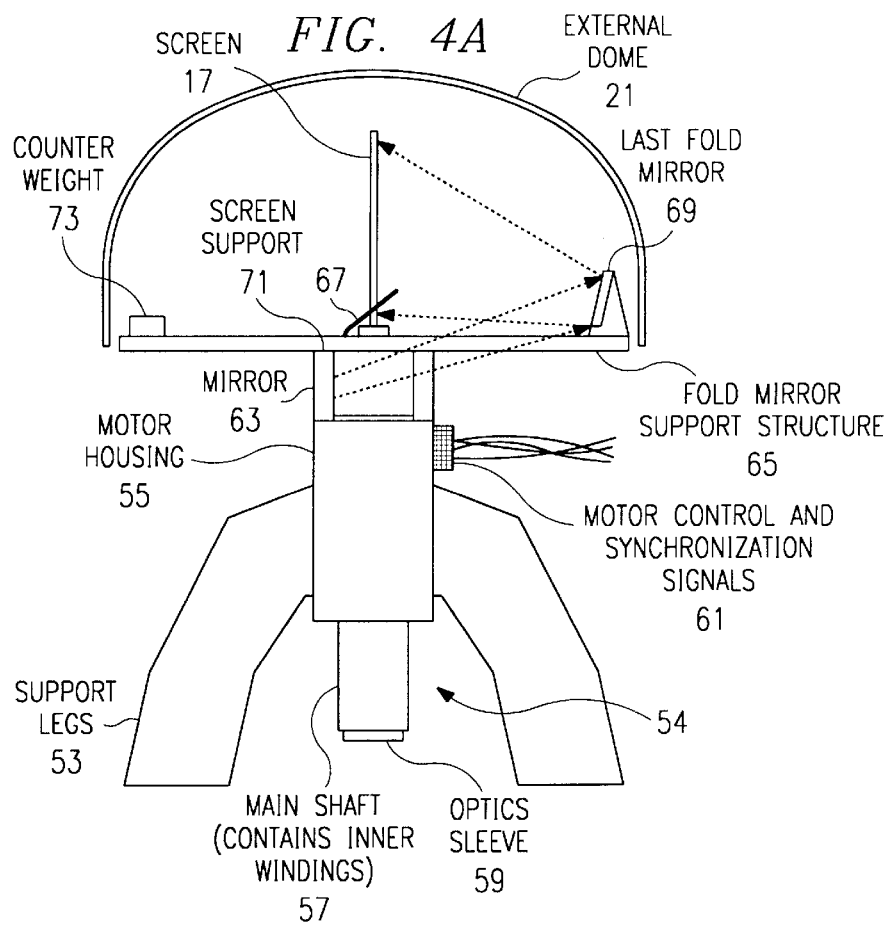
FIG. 4a is a side view of the mechanical assembly in accordance with the present invention.
Figure 4B:
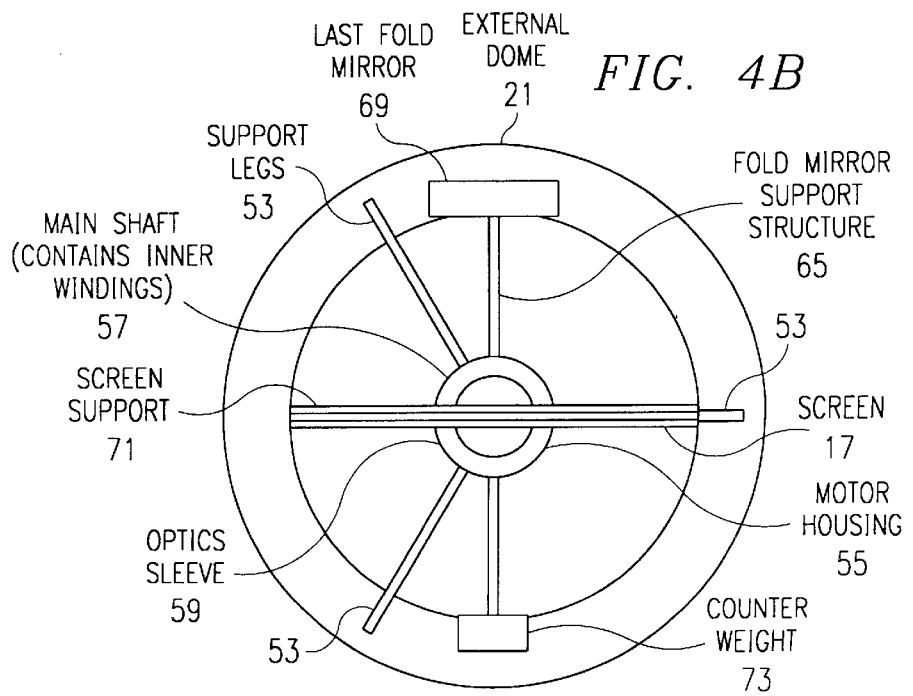

Referring now to FIGS. 4a to 4d, there is shown the mechanical assembly, which includes the screen, motor and external dome. The mechanical assembly includes, as shown in FIGS. 4a and 4b, support legs 53 to which is secured a motor housing 55 having a main shaft 57 therein with an optics sleeve 59 within the main shaft. Motor control and synchronization signal circuitry 61 extends to the motor housing 55 for controlling the motor in standard manner. The motor housing includes a support portion 63 to which is secured a fold mirror support structure 65. On the support structure there is disposed a first mirror 67 above the optics sleeve 59 which reflects light impinging thereon from the optics sleeve onto the last fold mirror 69 which is secured to the support structure 65. Light from the mirror 69 is reflected onto the vertical screen 17 which is secured to the support structure 65 by a screen support 71. A counter weight 73 is disposed on the support structure 65 diametrically opposite the mirror 69. The external dome 21 is positioned over and around the screen 17 and contains the three dimensional image therewithin.

Figure 4C:
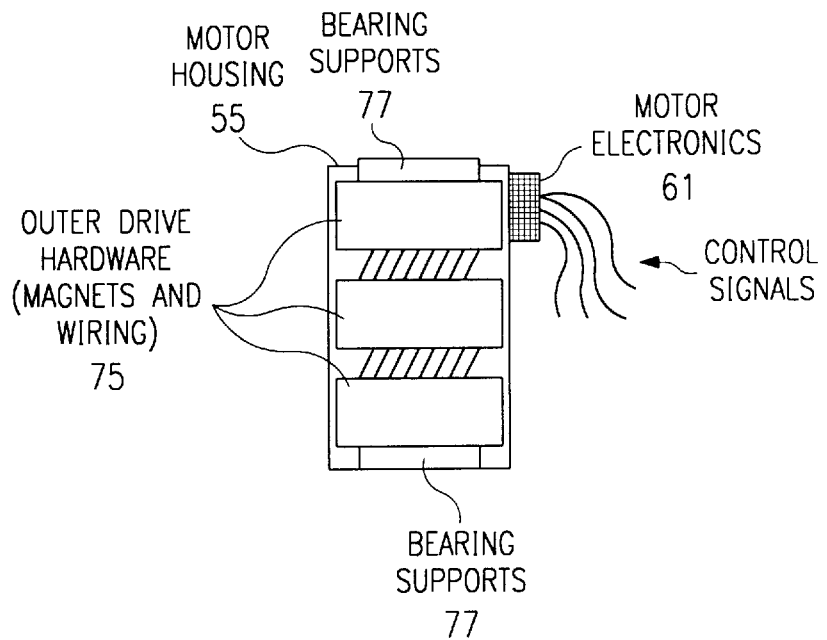
Figure 4D:
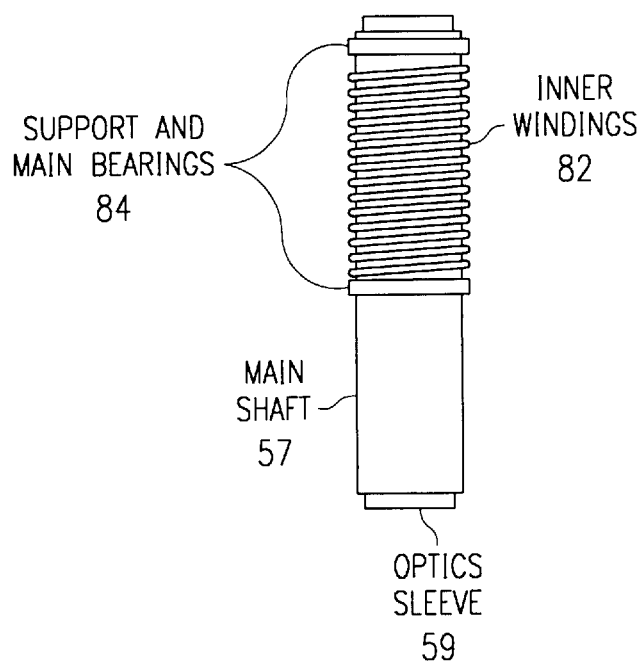
FIG. 4d is a side view of the main shaft of the motor and structure thereon.

The motor 54 comprises the motor housing 55 within which are included standard motor stator windings and magnets 75 secured thereto and bearing supports 77 as shown in FIG. 4c into which the motor rotor is disposed. The motor rotor is shown in FIG. 4d and includes a hollow main shaft 57 with inner windings 82 disposed about the upper portion of the main shaft with support and main bearings 84 which mate with the bearing supports 77 secured to the housing 55. By providing appropriate control signals to the. motor electronics 61 and current to the stator windings 75, as is well known, the rotor rotates at selected rotational speed with the bearings 83 rotating in the bearing supports 77. As will be explained in more detail hereinbelow, a two dimensional light array of an image from the image projector 9 and projector optics 13 travels through the optics sleeve 59 and the optics therein to the first mirror 67 from which it is reflected to the fold mirror 69 and then onto the screen 17. The rotation of the screen at a rotational speed synchronized to the projection of the light image thereon provides the three dimensional image within the external dome 21 in known manner as described in the above noted prior art.

As an alternative embodiment, the motor stator can be eliminated and the main shaft 57 can be disposed in bearings or the like and driven by a gearing system coupled to the exterior of the shaft to cause the shaft rotation. The rotational speed of the gearing system is adjusted in standard manner to synchronize the rotation of the screen 17 with the formation of the two dimensional images.

Figure 5:
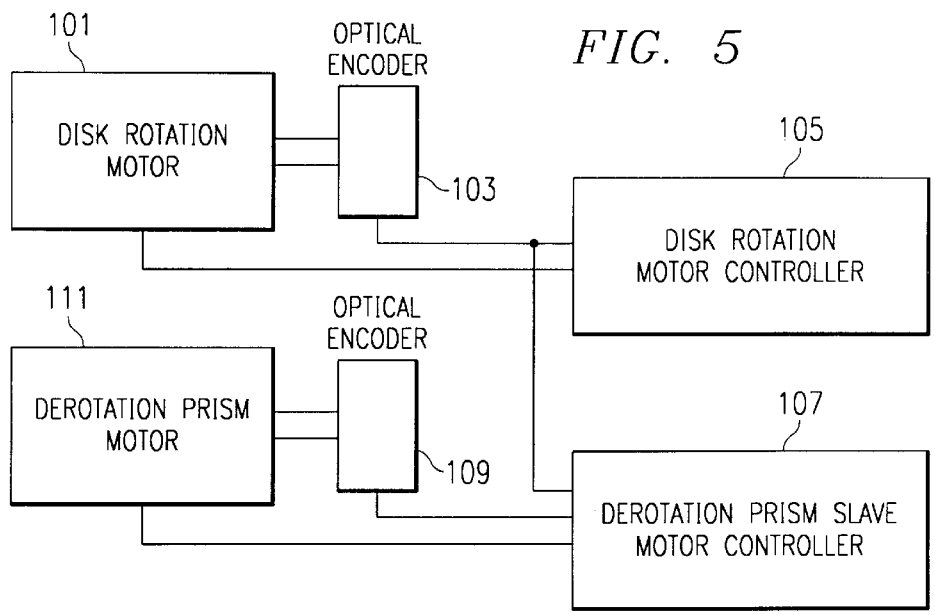
FIG. 5 is a schematic diagram showing screen rotation motor and derotation motor synchronization.

As is apparent, it is necessary that the exact location of the screen 17 in its rotational cycle be known in order that the images to be projected thereon can be scheduled and synchronized therewith. Accordingly, an encoder mechanism (not shown) of standard type is disposed on the rotor or elsewhere to provide the exact screen location. Signals indicative thereof are then transmitted to the appropriate electronics to provide required scheduling and synchronization. This is shown schematically with reference to FIG. 5 wherein the disk rotation motor 101 is the motor shown in FIGS. 4c and 4d and provides a signal to an optical encoder 103 to provide an indication of the motor and screen position. The optical encoder 103 then provides this position information to a motor controller 105 which, in turn, controls the rotational speed of the motor 101. The positional signals from the optical encoder 103 are also transmitted to a derotation prism slave motor controller 107 which also receives positional signals from an optical encoder 109 indicating the position of the derotation prism 83. The controller 107 then controls the rotational speed of the motor, drive system or the like 85 to cause the prism 83 to rotate in synchronism with the screen 17. The circuitry for performing the functions of the blocks in FIG. 5 is well known and need not be discussed in detail.

Figure 6A:
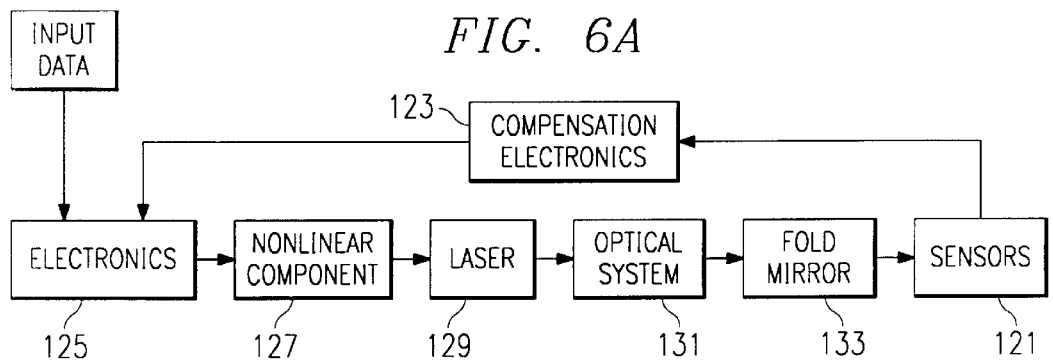
FIG. 6a is a circuit to adjust the system on-line for nonlinearly varying components in accordance with the present invention.

Referring now to FIG. 6a, there is shown a circuit to adjust the system on-line for nonlinearly varying components caused by, for example, optical, thermal and/or electrical drift which can degrade the image quality for any scanner or array based system, in this case, volumetric displays. This is accomplished by providing a sensor 121 which senses the degradation and indicates such degradation to a compensation electronics circuit or feedback electronics 123 which recognizes the type of degradation and provides a compensating or error signal. This feedback circuit 123 is a set of analog to digital converters and timing control circuits which, on command from system electronics 125, samples the output of sensors 121 and passes the sampled output as a digital feedback signal to system electronics 125. Compensation for nonlinearities occurs in system electronics 125 via a microprocessor controlled lookup table. System electronics 125 determines the contents of these lookup tables by using a classical control system approach which is that, at reasonable intervals, the microprocessor outputs a known positioning signal to the laser 129. The laser beam passes through optical system 131 and illuminates fold mirror 133 and the sensor 121. A measurement of exact position is made by feedback electronics 123 under control of system electronics 125 which compares the exact location versus expected location and computes an error. New lookup table values are calculated with corrections made to compensate for this error and incorporated into the lookup table in system electronics 125. Accordingly, the signals now entering the nonlinear components 127 have now been compensated to offset the nonlinearity in such components. Accordingly, the signal to the image projector 39, for example, a laser 129, adjusts the laser output. The image projector output then travels through the optical system 131 as described hereinabove and to the fold mirror 133 which corresponds to the fold mirror 89, 67 or 69.

Figure 6B:
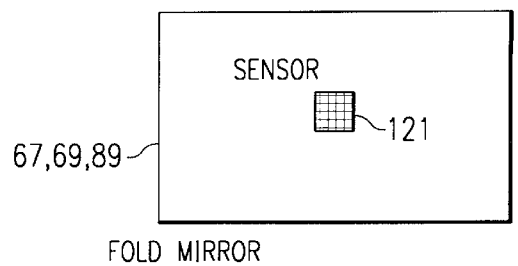

The sensor(s) 121 can be disposed in one of the fold mirrors as shown in FIG. 6b. In this case, the sensor(s) are located immediately beneath the reflective surface of the mirror to allow light to pass to the sensors. A fold mirror associated with sensors will have some translucency so that the image impinging upon the mirror can travel to the sensor. The sensors are placed in precise locations so the signals fed back therefrom can be correlated with the precise location of each sensor in the compensation electronics.

Figure 7:
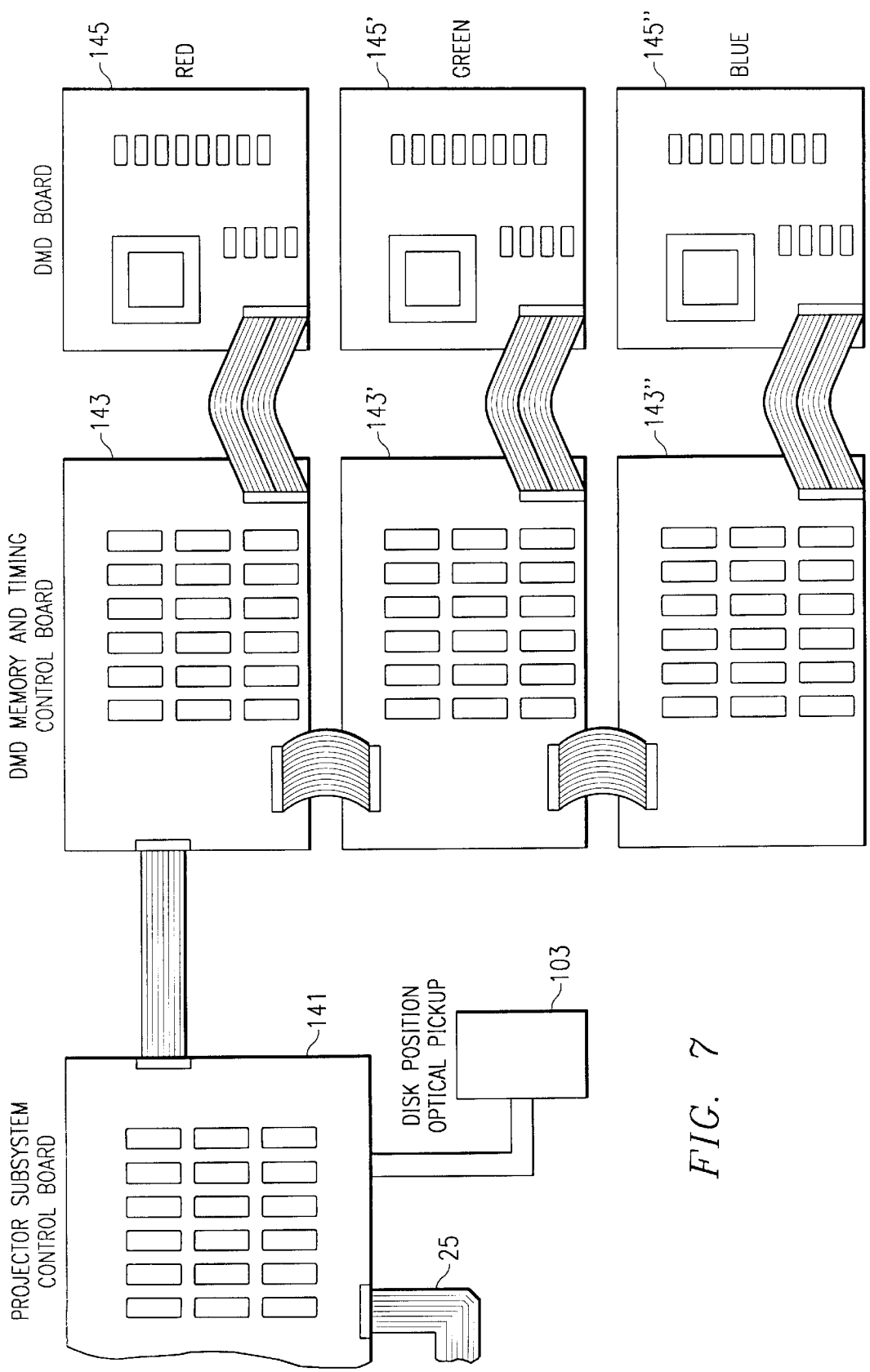
FIG. 7 is a circuit diagram of the projector electronics in accordance with the present invention.

The projector electronics 11 for use in conjunction with DMDS, is shown in greater detail in FIG. 7, receives data signals from the graphics accelerator of the workstation 1 at a control board 141 via the voxel bus 25. The received data is placed in a FIFO buffer awaiting transfer to the DMD Memory and Timing Board 143. At the appropriate time, as controlled by board 143, data is transferred from the FIFO to board 143. The graphics accelerator control board 141 is a multipurpose custom circuit board which generates timing synchronization signals for DMD memory and timing control boards 143, 143' and 143" using the disk position optical pickup 103. The exact disk or screen 17 position is received at the disk position optical pickup 103 and transferred to the control board 141. The graphics accelerator control board 141 also interprets system control signals from the host graphics accelerator and changes operational characteristics (such as DMD timing and number of DMD mirrors updated and the order of the update) for DMD memory and control boards 143, 143' and 143"; signals the host graphics accelerator that a volume frame has been displayed; swaps memory buffers in the DMDS memory and timing control boards 143, 143' and 143" using a double buffering technique to refresh the display from one memory buffer while downloading data from the host graphics accelerator to another memory buffer; and receives data from host graphics accelerator and control voxel bus handshaking. The control board 141 also includes a microsequencer to coordinate the information received on the bus 25. The circuit 141 synchronizes the data received on bus 25 so that it can be fed into the DMD memory. The clocks are synchronized by the control board 141 which uses a pulse train generated by the disk position optical pickup 103 when the screen 17 rotates. These pulses are converted via a programmable phase locked loop on circuit 141 to the number of slices per revolution of the screen 17. For each slice, the control board 141 sends a pulse to the DMD boards 143, 143' and 143" to begin the timing sequence to display one slice. The information (all of the information required to recreate a three dimensional image for a complete rotation of the disk or screen) is then sent to DMD memory and timing control circuitry 143, 143' and 143" on a color by color basis, there being one such circuit for each of red, green and blue. DMD memory and timing control circuit boards 143, 143' and 143" are sent color data simultaneously from the host graphics accelerator. Each board has a corresponding color control bit in the data which word identifies it as a destination. Auxiliary timing, as required, is also provided by these circuits. The outputs of each of the circuits 143, 143' and 143" are sent to DMD boards 145, 145' and 145" respectively to provide the controls on the control electrodes 37 of the DMDs 35 as shown in FIGS. 2a to 2e to control the angle of deflection of the DMD and thereby control the intensity of the light reflected from the DMD. Some timing circuitry is provided in this circuit also.

Figure 7A:
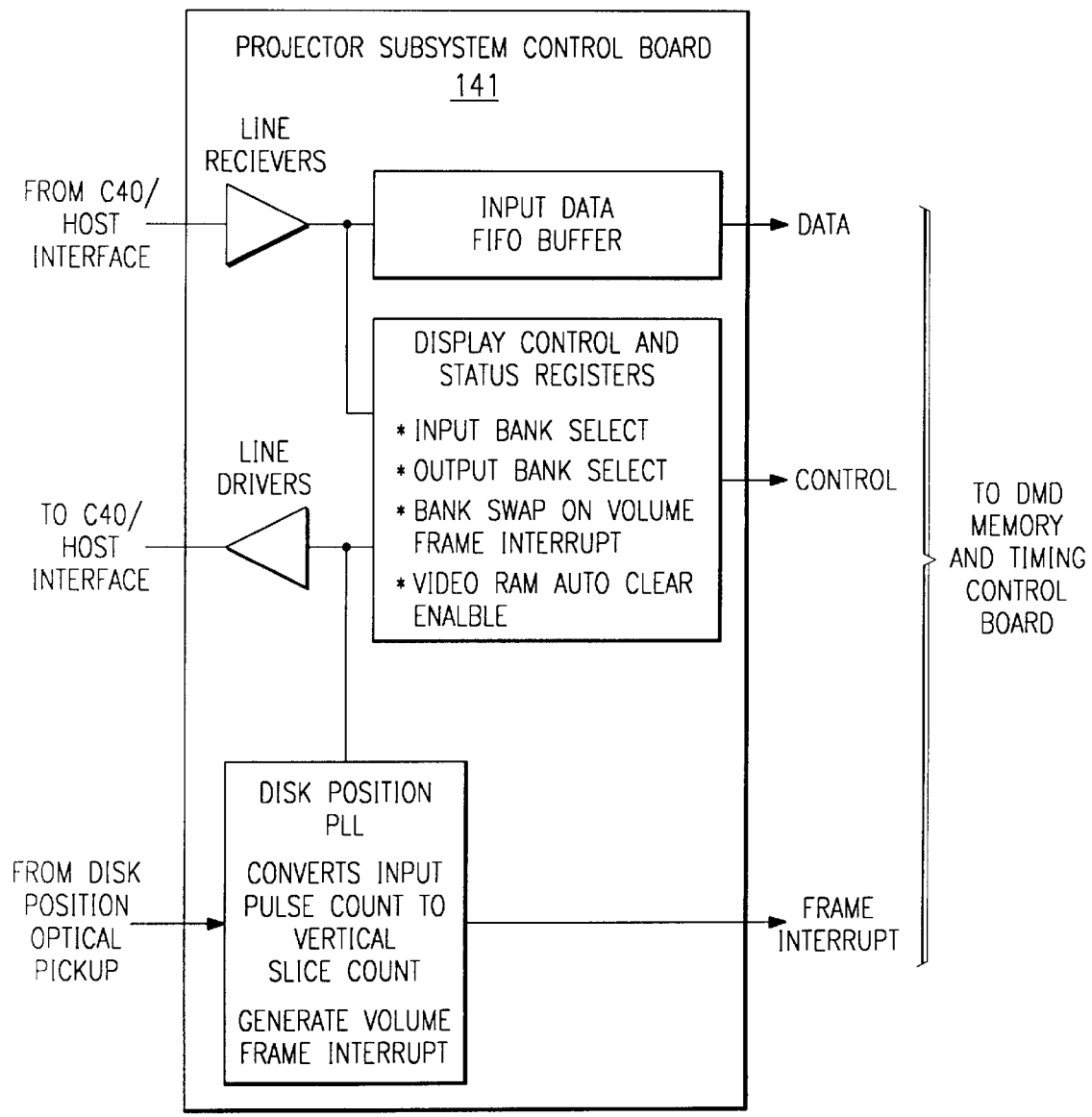
FIG. 7a is a schematic diagram of a projector subsystem control board.

The Projector Subsystem Control Board 141 shown in FIG. 7a has several main functions and contains line receivers and drivers for receiving and sending data and control information via the voxel bus 25 from the host graphics accelerator. In addition, data received at board 141 is placed in a FIFO buffer awaiting transfer to the DMD Memory and Timing Control Board 143. At the appropriate time, as controlled by board 143, data is transferred from the FIFO to board 143. A set of control registers is loaded from the graphics accelerator board, these registers controlling which of two video random access memory (VRAM) banks on boards 143, 143' and 143" receives data and which of these two VRAM banks on boards 143, 143' and 143" send data to the DMD boards 145, 145' and 145". The control registers also control whether the above functions are swapped on a volume frame interrupt as well as whether to clear one of the VRAM banks on boards 143, 143' and 143" on a volume frame interrupt. The control registers also control other functions such as the number of rows and the number of vertical slices for boards 143, 143' and 143" to send to the DMD boards 145, 145' and 145".

The disk position optical pickup produces a pulse train which is converted via a programmable phase locked loop to slice interrupt pulses and volume frame interrupt pulses. For each slice interrupt pulse, the DMD Memory boards 143, 143' and 143" initiate a timing sequence in step with boards 145, 145' and 145" downloading a vertical slice from VRAM boards 143, 143' and 143" to the DMD boards 145, 145' and 145" DMD devices.

Figure 7B:
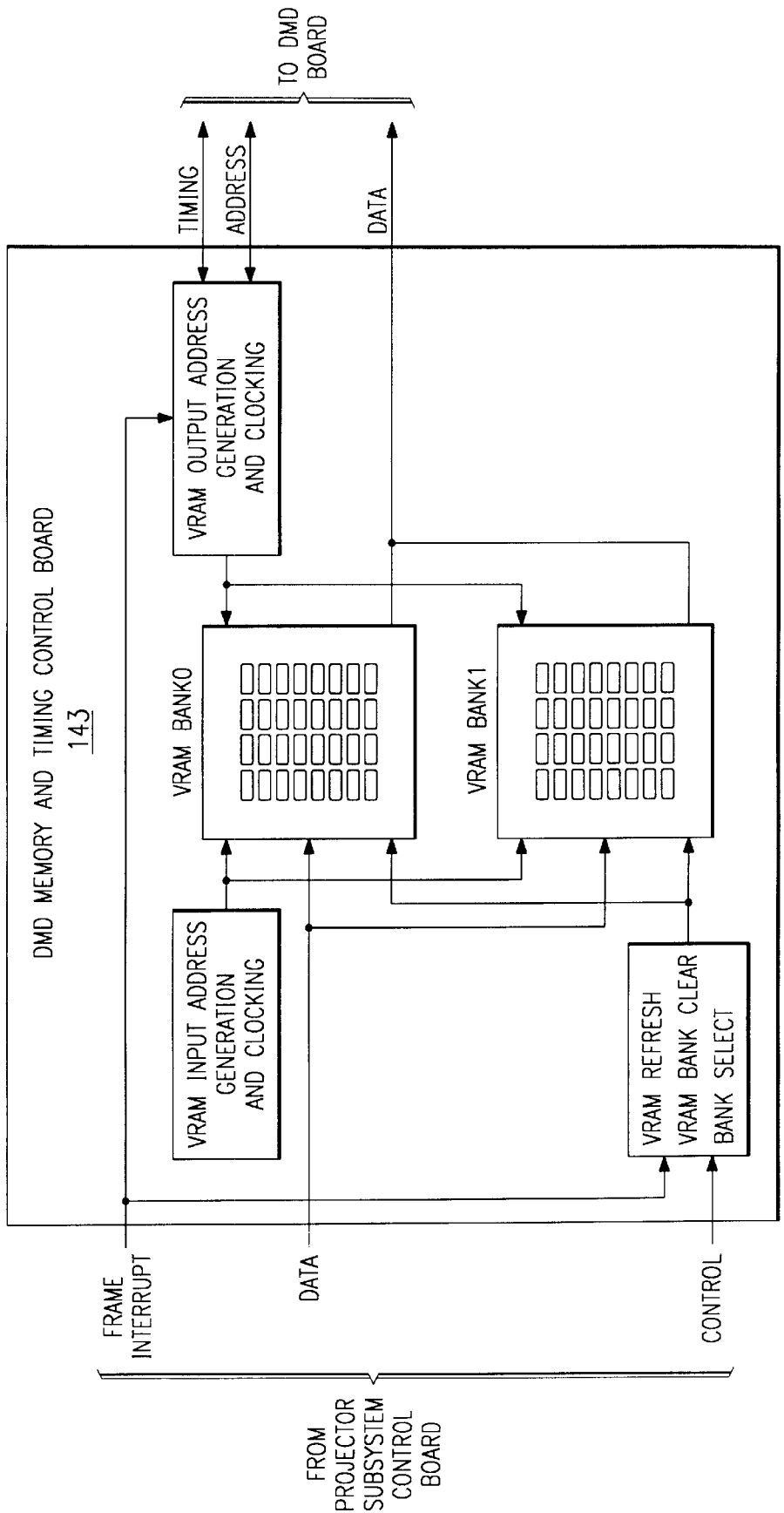
FIG. 7b is a schematic diagram of a DMD memory and timing control board.

The DMD Memory and Timing Control Board shown in FIG. 7b has two principal functions, these being holding display data in VRAM band #0 and band #1 and controlling this VRAM. There are two separate banks of VRAM so that one bank can be used to refresh, that is, send a volume frame's data to DMD boards 145, 145' and 145", while the other bank can be loaded from the graphics accelerator board via the projector subsystem control board 141. This avoids memory access conflicts that would occur if boards 145, 145' and 145" and board 141 accessed the same VRAM bank.

Circuitry used for timing generates the appropriate addressing and control signals to the VRAM bank to write voxel data at the maximum data rate possible, given the limitations of the VRAM memorytiming characteristics and to generate control signals to the VRAM bank to read back data clocked (timed) in step with the DMD device on the DMD boards 145, 145' and 145".

Other functions include controlling VRAM refresh, a necessary part of dynamic random access memory (DRAM) usage and VRAM bank clear, which clears a VRAM bank to all zeros on command from the projector subsystem control board 141.

Figure 7C:
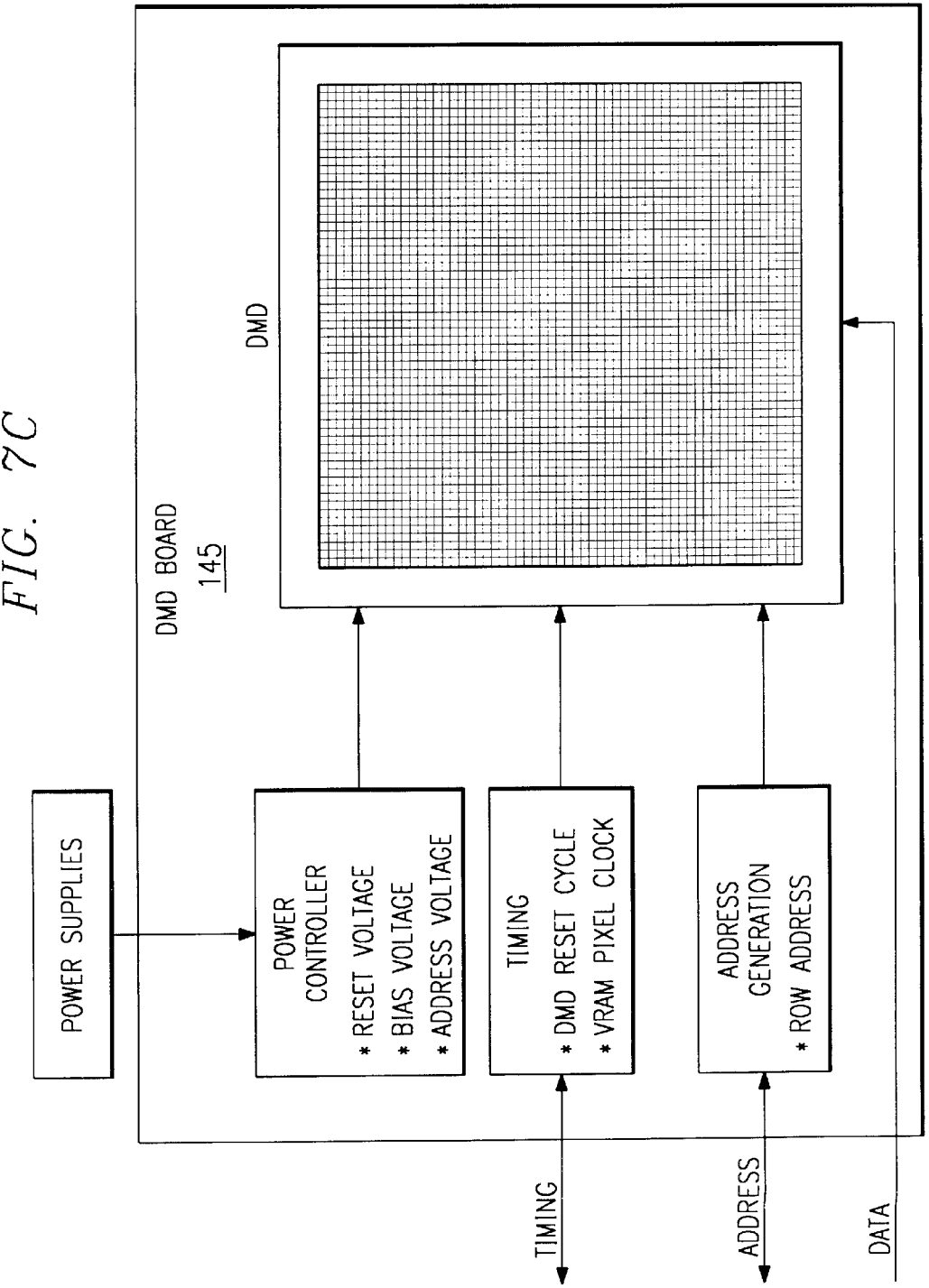
FIG. 7c is a circuit diagram of a DMD board.

The DMD boards 145, 145' and 145" shown in FIG. 7c each contain circuitry to support the DMD device. They include circuitry to address the DMD devices, generating consecutive row and column addresses that direct incoming data from the VRAM on boards 143, 143' and 143" to the correct micro-mirror row and column. The DMD boards 145, 145' and 145" also contain timing circuitry which controls the timing of address and reset voltages to the DMD devices as well as power control circuitry which protects the DMD devices from damage caused by incorrect input voltages and incorrect device control timing.

Figure 8:
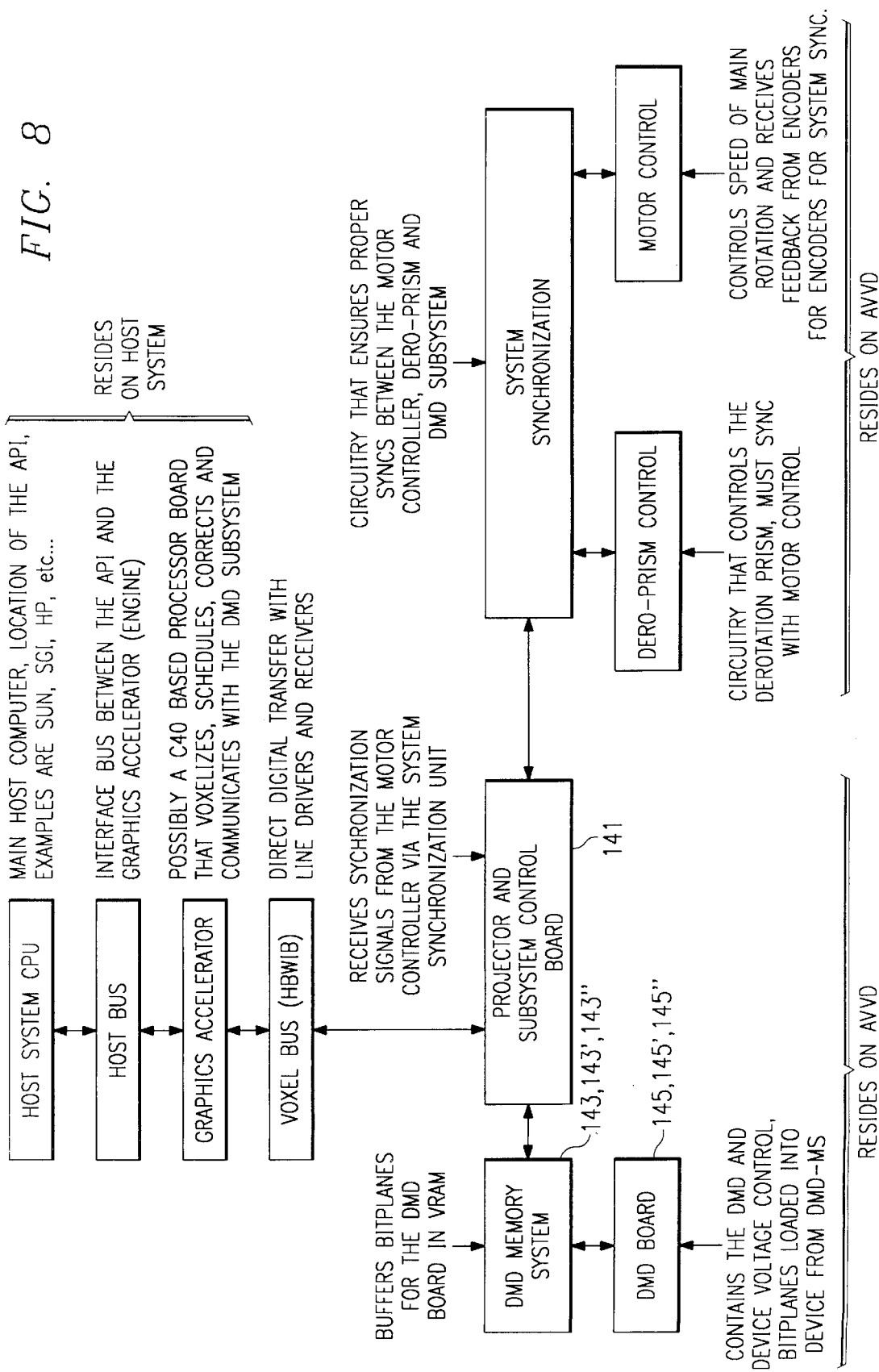
FIG. 8 is a schematic diagram of the work station electronics, the projector electronics and the synchronization electronics therefor.

Referring now to FIG. 8, there is shown a schematic diagram of the work station electronics, the projector electronics 11 and the synchronization electronics therefor. The work station electronics includes the host system CPU which is the main host computer and is the location of the API software. The host CPU communicates via a host bus with the graphics accelerator which is, for example, a TMS320C40 based processor that voxelizes, schedules, corrects and communicates with the DMD subsystem. The graphics accelerator communicates via the voxel bus, which is a direct digital transfer with line drivers and receivers, with the Projector Subsystem Control Board 141 which buffers in a first infirst out (FIFO) buffer, voxel data. The DMD memory system communicates with DMDs on a DMD board which contains the DMDs and device voltage control and bitplanes or slices loaded into the DMD device from the DMD memory system 143, 143' and 143". The DMD memory system communicates with a DMD controller which receives synchronization signals from the motor controller via the system synchronization unit. The system synchronization communicates with the DMD controller and motor control and includes circuitry which insures proper synchronization among the motor controller, derotation prism and DMD subsystem. The derotation prism includes circuitry that controls the derotation prism and must be synchronized with the motor control. The motor control controls the speed of the main rotation system and receives feedback from encoders for system synchronization.

There are many types of software which can be successfully utilized in conjunction with the host system. The host system software dictates the platform or type of computer used to drive the AVVD. Unix platforms including Sun (SunOS-Solaris), Silicon Graphics (Irix), Hewlett Packard and IBM RS-6000 systems can be used. Also, PCs running DOS and Windows as well as Apple systems and PCs running some type of Unix or OS/2 can be used as the host system.

The API software comprises (1) the SIGMA classes and (2) the AVVD library. The SIGMA classes comprise a set of routines that are similar to SGI gl or OpenGL. These functions allow for rendering of images, transformations, color manipulations, setting of image attributes (point densities) and system communication.

The correction software is to provide compensation for electrical, mechanical and optical nonlinearities or deviations from theoretical thresholds. In many cases, known hardware problems can be corrected in software at a fraction of the cost of rebuilding or retrofitting existing hardware. This correction or compensation is seen in derotation to address compensation for image rotation resulting from the rotating screen as well as in Keystone correction which results from image plane/screen misalignment and lookup tables for remapping of scanned or array address values that are not in their theoretical position (possibly due to a non-functioning pixel, DMD or the like).

Figure 9:
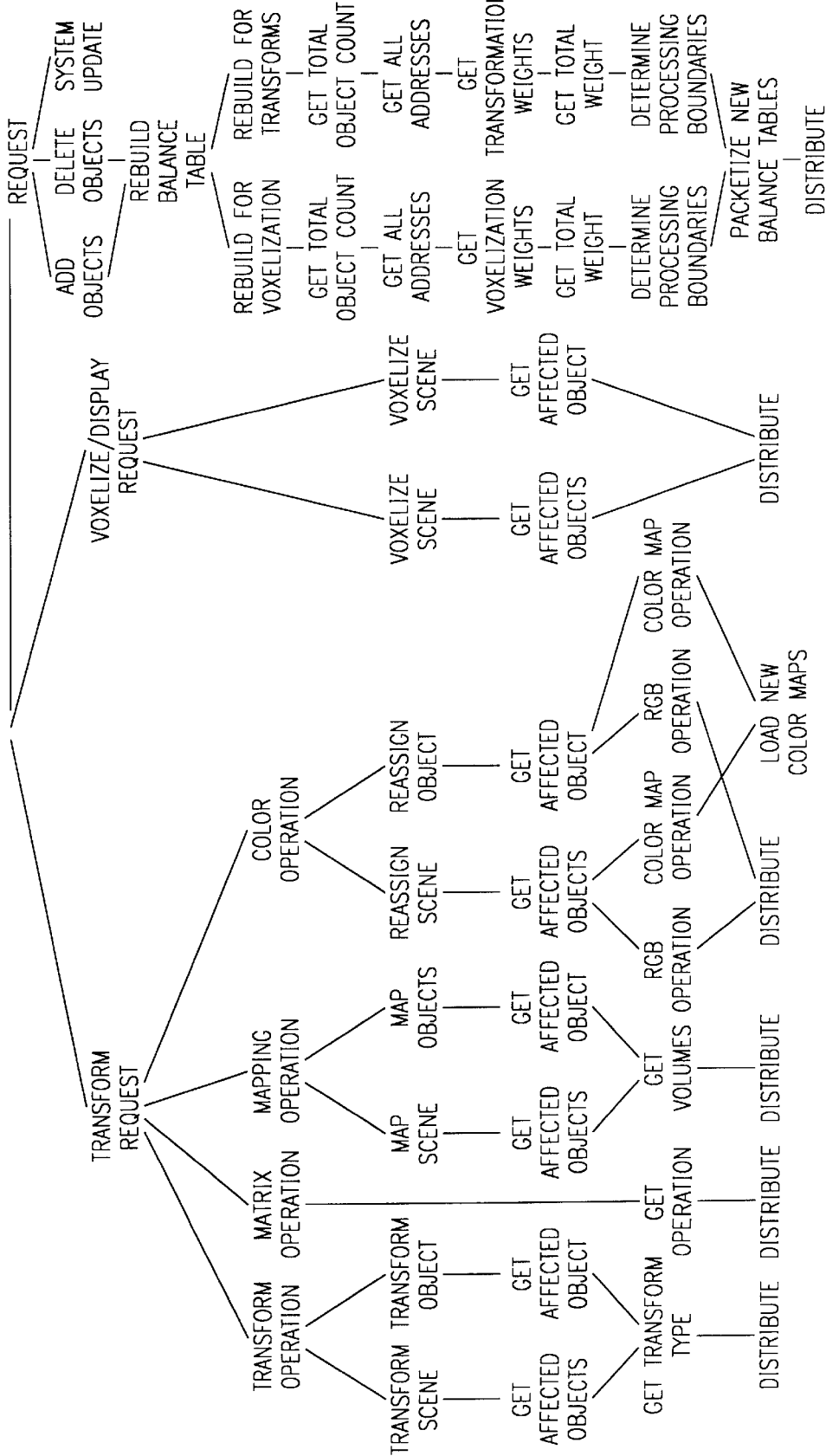
FIG. 9 is a chart of the system control flow.

The system control flow is shown in FIG. 9 which is self-explanatory.

Figure 10A:
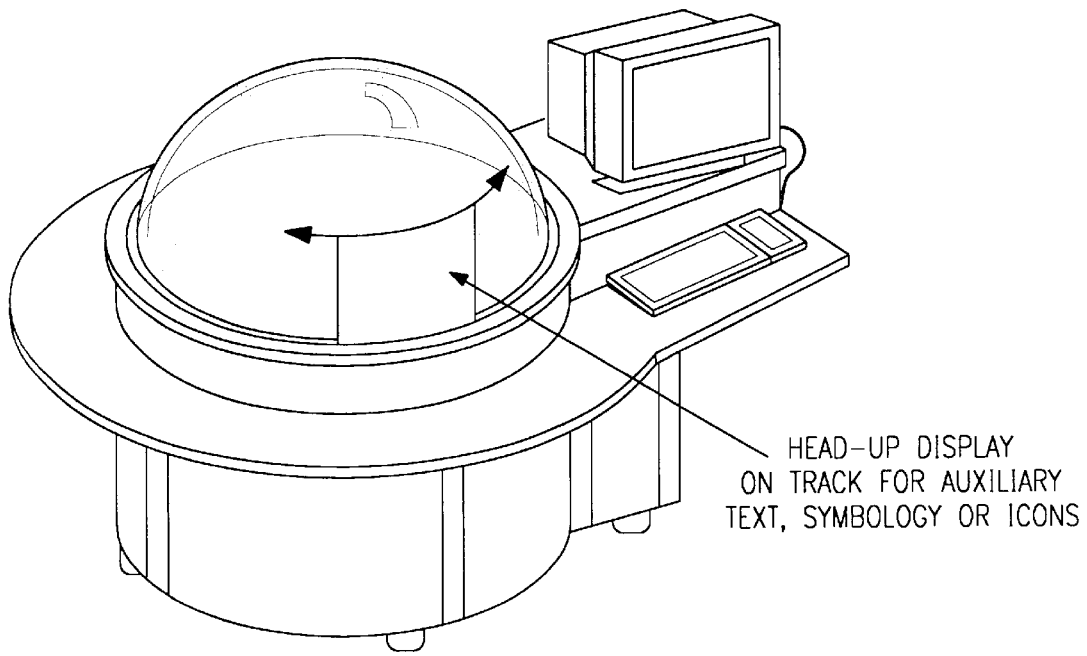
FIG. 10a is an elevational view of a three dimensional display and Head-Up Display in accordance with the present invention.
Figure 10B:
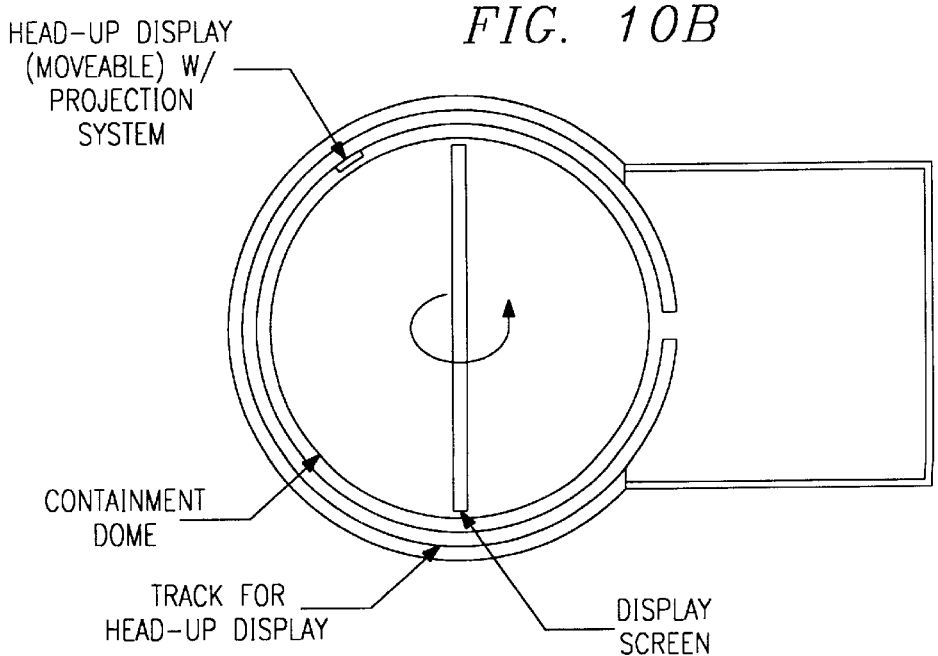

Referring now to FIG. 10a, there is shown an elevational view of a three dimensional display, the work station primary monitor (CRT) and Head-Up Display in accordance with the present invention. FIG. 10b is a top view of the Head-Up Display assembly as shown in FIG. 10a. The work station sends graphics or text information across the work station (SCSI) bus to the primary display monitor CRT and simultaneously sends either the same or different information through a VME-chassis or other bus communication card to the communication bus on the HUD. With some combinations of work stations and applications, it will be necessary to use a commercially available circuit board (such as the Video Splitter for the Silicon Graphics) which enables a programmer to drive two different graphics application displays simultaneously from the same work station.

The user commences operation of the display system by generating application data on the work station. Data may be (a) xyz points in ASCII or binary format, (b) a file with a known format containing point, line or facet data, (c) an ASCII Object File (AOF) that contains data already converted to be compatible with the SIGMA software, (d) a routine which generates three dimensional lines, points or facets or (e) some previously undefined data format. The user may generate his own program which manipulates his own special data formats or may use the SIGMA command line utilities if data is in formats (a), (b) or (c) supra. These SIGMA (C++) classes or the AVVD library which runs on top of the SIGMA classes allow the user to specify procedures to be invoked which will manipulate (e.g., scale, rotate, translate, etc.) the images when they are displayed. After the desired manipulation is defined, the data is in an array format of (x, y, z, color, priority). Then the user invokes the scheduler which converts this data into a binary array of commands (display list or dlist) for the projector electronics where position in the array is related to the rotational timing. This dlist is a temporary data structure for a specific display image which has been converted into binary commands for the projector electronics.

In the preferred embodiment, the dlist is passed by the API software from the work station CPU or disk drives to the Host graphics accelerator which communicates via the voxel bus 25 with the AVVD display subsystem 3. In one alternative embodiment only the host system CPU remains on the work station, allowing multiple work stations to communicate with the AVVD. In another alternative embodiment, the host system CPU/memory, work station high speed bus, host graphics accelerator and voxel bus are all embedded inside the AVVD or the Host graphics accelerator is physically within the AVVD display.

The dlist commands are received by the projector electronics 11 which converts the dlist commands into on/off commands for the image projector 9 (DMDs) at the times specified by the dlist. The DMDs deflect to either reflect of not reflect light, creating a two-dimensional image. The two-dimensional image is reflected off the DMDs through the projector optics 13, where it is transformed into a stable image by the derotation system 85. The projected image is reflected off a first fold mirror 89 into the main shaft 57 containing refocus and projection lenses 93 which create an image of the proper size, focus and alignment. The image is reflected off a second fold mirror 67 onto the rotating screen assembly 17. During this process, the disk rotation motor 101 rotates the screen 17, synchronized to the speed of the derotation prism motor 111 by the derotation prism slave motor controller 107. Disk position information is passed by the disk position encoder 103 to the projector electronics to synchronize the generation of the two-dimensional image with the rotational position of the screen. When the two-dimensional image strikes the screen, the screen diffuses the light beams to form discrete points of light which, due to the rotational component of the screen, appear to form a three-dimensional image suspended in space.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. An apparatus, comprising:

a main display;

an auxiliary display;

support means for supporting said auxiliary display adjacent said main display; and image generating means for supplying first image information to said main display in a manner producing a volumetric image display, and for displaying second image information on said auxiliary display;

wherein said support means supports said auxilary display for movement relative to said volumetric image display along a path extending in a direction substantially circumferential to said volumetric image display.

2. An apparatus comprising:

a main display;

an auxiliary display;

support means for supporting said auxiliary display adjacent said main display; and image generating means for supplying first image information to said main display in a manner producing a volumetric image display, and for displaying second image information on said auxiliary display;

wherein said main display includes a stationary portion, an element having a surface thereon and supported on said stationary portion for rotation about an axis, and drive means for effecting rotation of said element relative to said stationary portion about said axis;

wherein said image generating means transmits said first image information to said element in synchronism with rotation thereof in a manner producing said volumetric image display; and wherein said support means supports said auxiliary display for movement relative to said stationary portion along an arcuate path which is approximately concentric to said axis, and permits said auxiliary display to be selectively positioned at any one of a plurality of positions along said arcuate path.

3. An apparatus according to claim 2, wherein said path is circular.

4. An apparatus according to claim 2, wherein said second image information is two-dimensional image information, and wherein said auxiliary display includes a two-dimensional display device on which said second image information is displayed.

5. An apparatus, comprising:

a main display;

an auxiliary display;

a support portion operable to support said auxiliary display adjacent said main display; and an image generating portion operable to supply first image information to said main display in a manner producing a volumetric image display, and to display second image information on said auxiliary display;

wherein said support portion supports said auxiliary display for movement relative to said volumetric image display along a path extending in a direction substantially, circumferential to said volumetric image display.

6. An apparatus according to claim 5, wherein said path is a substantially arcuate path concentric to a vertical axis which extends through said volumetric display.

7. An apparatus according to claim 6, wherein said path is circular.

8. An apparatus according to claim 5, wherein said second image information is two-dimensional image information, and wherein said auxiliary display includes a two-dimensional display device on which said second image information is displayed.

9. An apparatus according to claim 8 wherein said auxiliary display faces away from said volumetric display in each position of said auxiliary display along said path.

10. An apparatus according to claim 5, wherein said auxiliary display can be selectively positioned at any one of a plurality of positions along said path.

* * * * *

UNITED STATES PATENT AND TRADEMARK OFFICE
CERTIFICATE OF CORRECTION

PATENT NO. : 6,208,318 B1
DATED : March 27, 2001
INVENTOR(S) : Christine R. Spiegl It is certified that error appears in the above-identified patent and that said Letters Patent is hereby corrected as shown below:

Title page,
Item [75] Inventors: after "Inventors:", delete "Douglas W. Anderson, Richardson; Thomas Drew Fisher, Dallas; Gregory A. Hatch, Plano; Tommy Dean Wright, Irving; Christine R. Spiegl, Plano, all of TX (US)", and insert -- Christine R. Spiegl, Plano, TX (US) --.

Column 5,
Line 33, after "being", delete ".".

Column 6,
Line 53, after "upon", delete ".".

Column 7,
Line 18, after "mirror", delete "491", and insert -- 49' --.
Line 60, after "through", delete ",".

Column 8,
Line 1, after "utilizes", delete "DMDS", and insert -- DMDs --.
Line 3, after "89", delete ".".
Line 39, after "the", delete ".".

Column 9,
Line 61, delete "DMDS", and insert -- DMDs --.

UNITED STATES PATENT AND TRADEMARK OFFICE
CERTIFICATE OF CORRECTION

PATENT NO. : 6,208,318 B1
DATED : March 27, 2001
INVENTOR(S) : Christine R. Spiegl It is certified that error appears in the above-identified patent and that said Letters Patent is hereby corrected as shown below:

<u>Column 10,</u>
Line 13, after "the", delete "DMDS", and insert -- DMDs --.

<u>Column 14,</u>
Line 45, after "substantially", delete ",".
Line 57, after "claim 8", insert -- , --.

Signed and Sealed this

Eleventh Day of December, 2001

Attest:

NICHOLAS P. GODICI
*Attesting Officer*    *Acting Director of the United States Patent and Trademark Office*